United States Patent
Batawi et al.

(10) Patent No.: US 7,138,355 B2
(45) Date of Patent: Nov. 21, 2006

(54) METHOD OF PREPARING AN INK

(75) Inventors: Emad Batawi, Winterthur (CH); Cyril Voisard, Fontenais (CH)

(73) Assignee: Sulzer Hexis AG, Winterthur (CH)

(*) Notice: Subject to any disclaimer, the term of this patent is extended or adjusted under 35 U.S.C. 154(b) by 453 days.

(21) Appl. No.: 10/449,194

(22) Filed: May 29, 2003

(65) Prior Publication Data

US 2004/0005495 A1 Jan. 8, 2004

(30) Foreign Application Priority Data

May 30, 2002 (EP) .................. 02405433

(51) Int. Cl.
*H01M 4/88* (2006.01)
*H01M 4/86* (2006.01)

(52) U.S. Cl. .................. 502/101; 429/40
(58) Field of Classification Search .............. 429/30, 429/40; 502/101
See application file for complete search history.

(56) References Cited

U.S. PATENT DOCUMENTS

| | | | |
|---|---|---|---|
| 4,590,090 A * | 5/1986 | Siemers et al. ............. | 427/453 |
| 5,532,071 A * | 7/1996 | Pal et al. ..................... | 429/12 |
| 2001/0034296 A1 | 10/2001 | Xiao et al. | |

FOREIGN PATENT DOCUMENTS

| EP | 1081778 A1 | 3/2001 |
|---|---|---|
| JP | 10079250 | 3/1998 |

OTHER PUBLICATIONS

DATABASE WPI, Section Ch, week 200229, Derwent Publications Ltd., AN 2002-227718. XP002273551.

* cited by examiner

*Primary Examiner*—Patrick Joseph Ryan
*Assistant Examiner*—Thomas H. Parsons
(74) *Attorney, Agent, or Firm*—Townsend and Townsend and Crew LLP

(57) ABSTRACT

The disclosure concerns a method of preparing an ink (P) which can be used for the manufacture of a functional layer (6), in particular for the manufacture of an electrode for fuel cells, which ink contains dispersely distributed particles (101, 102) forming two solid phases, with catalytic reactions being able to be activated in the manufactured functional layer on a gas/solid interface by a combined action of the two solid phases and with gaseous reactants. In a first step (1), the solid phases are formed as fine-grain particles (P1, P2) and the particles of both solid phases are dispersed in a first liquid (L1) in a mixed and homogeneously distributed manner (2). Heterogeneous conglomerates (P3) of the fine-grain particles are formed from the thereby created dispersion (D); these conglomerates are mixed to form a homogeneous ink (P), after sintering (4), by addition of a second liquid (L2) and by comminution (5), with particles formed in the first step having such a fine grain that the heterogeneous conglomerates and their fractions each contain a plurality of particles of both solid phases after comminution.

11 Claims, 1 Drawing Sheet

METHOD OF PREPARING AN INK

RELATED APPLICATIONS

This application claims the priority of European Patent Application No. 02405433.0 filed May 30, 2002, the disclosure of which is incorporated herein by reference.

BACKGROUND OF THE INVENTION

The invention relates to a method of preparing an ink which can be used for the manufacture of a functional layer, in particular for the manufacture of an electrode for fuel cells, which can be operated at medium or high temperatures. The invention also relates to such an ink, a use of this ink and to a high temperature fuel cell.

In a high temperature fuel cell (SOFC fuel cell), oxidizing gases, on the one hand, and reducing gases, on the other hand, react to electrochemically active elements while producing electrical and thermal energy. With planar fuel cells, the electrochemically active elements are formed in a film-like manner and each include the following functional layers: two electrode layers, the anode and the cathode, on which electrochemical electrode reactions take place between the gases and catalytically active substances of the electrodes, and a solid electrolyte layer which separates the electrode layers and which is a layer of an ion-conductive solid material electrolyte. In simpler embodiments of the electrochemically active element, the solid electrolyte layer forms a carrier structure for the electrode layers. The manufacture of such electrode layers is described, for example, in EP-A 0 902 493.

A high temperature fuel cell is known from DE-A-19 819 453 in which an anode substrate forms a carrier structure. An intermediate anode layer, a preferably very thin solid electrolyte layer and the layer-like cathode are applied to this carrier structure. The anode substrate and the intermediate anode layer are functional layers which are manufactured from the same electrode material, namely from a porous cermet which consists of a ceramic material YSZ (yttrium stabilized zirconium oxide) and nickel.

YSZ is also used for the solid electrolyte structure (carrier structure or layer applied by coating). In a zone at the interface between the anode and the electrolyte, the electrochemical reactions take place at so-called three-phase points (nickel/electrolyte/pore). With these electrochemical reactions, nickel atoms are oxidized by oxygen ions ($O^{2-}$) of the electrolyte and these are again reduced by a gaseous fuel ($H_2$, CO), with $H_2O$ and $CO_2$ being formed and the electrons released in the oxidization being conducted further by the anode substrate. The nickel oxide, with which the redox processes of alternating reduction and oxidation take place, is termed an "active oxide".

The cathode is also a functional layer in which two solid phases form three-phase points together with a pore space. Oxygen molecules from the pore space react, while taking up electrons, to form oxygen ions which are passed on by the one of the solid phases to the solid electrolyte layer. The electrons are supplied to the cathode from an inter-connector which connects the electrochemically active elements of adjacent fuel cells.

The functional layers can be manufactured with an ink-like material which is applied by means of a screen printing process to a substrate, for example onto the electrolyte layer. After a drying step, the coating material is sintered onto the substrate by firing.

In order for a large turnover of the electrode reactions to result on the electrodes, these functional layers must have a large density at three-phase points. To obtain a large density, the two solid phases must be joined together in the form of very fine particles. It is possible to manufacture such particles by means of chemical processes. However, it has been found that with a manufacture of an ink, these particles cannot be mixed homogeneously. As a result of cohesion forces, homogeneous aggregations form which each consist of a large number of particles of the same solid phase. The required three-phase points only result at the borders between the aggregations.

SUMMARY OF THE INVENTION

It is an object of the present invention to provide a method of preparing an ink which is manufactured of fine particles of two solid phases and in which the two solid phases form a substantially larger number of contact points than with the ink with the homogeneous aggregations.

The method is a preparation of an ink which can be used for the manufacture of a functional layer, in particular for the manufacture of an electrode for fuel cells. The ink contains dispersely distributed particles forming two solid phases. Catalytic reactions can be activated in the manufactured functional layer on a gas/solid interface by a combined action of the two solid phases and with gaseous reactants. In a first step, the solid phases are formed as fine-grain particles. The particles of both solid phases are mixed and dispersed in a homogeneously distributed manner in a first liquid. Heterogeneous conglomerates of the fine-grain particles are formed from the dispersion arising in this connection. These conglomerates are mixed to form a homogeneous ink after sintering by adding a second liquid and while being crushed. The particles formed in the first step have such a fine grain that the heterogeneous conglomerates and their fractions each contain a plurality of particles of both solid phases after the crushing.

The method in accordance with the invention is advantageous for another reason. The fine-grain particles of the first process step result in an ink whose proportion of solid is relatively small due to the very large specific surface. The ink applied to the electrolyte layer results in a very porous layer in which strains form during sintering due to shrink effects. These strains can be so large that chipping off of the coating from the electrolyte layer results. In the ink formed from the heterogeneous conglomerates or in their fractions, the solid portion is much larger and the shrinkage effects correspondingly smaller. The sintered-on coating thus adheres well to the electrolyte layer.

The method in accordance with the invention can also be used for the preparation of inks which are also provided for functional layers other than the electrode layers.

The invention will be described in the following with reference to the drawings.

DESCRIPTION OF THE PREFERRED EMBODIMENTS

Figure 1:
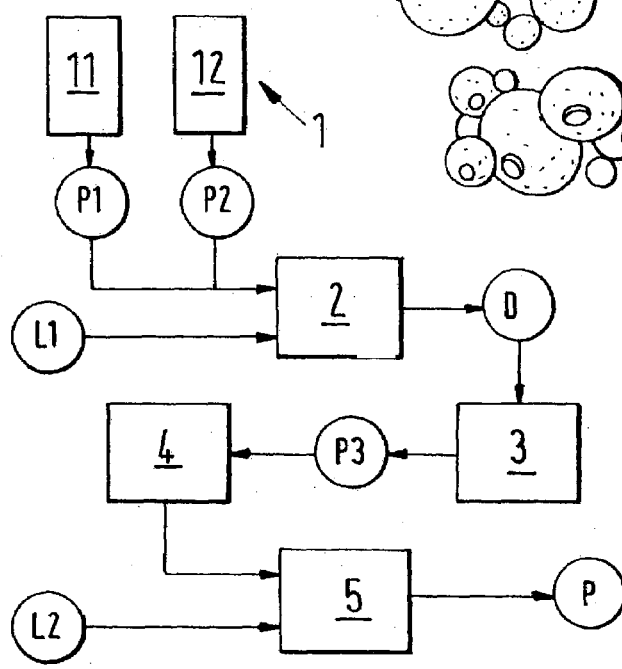
FIG. 1 is a block diagram referring to the method in accordance with the invention.

In FIG. 1, a block diagram of the method of the invention is shown. In a first step 1, fine-grain particles P1 and P2 are produced in reactors 11 and 12 by means of chemical processes and have a high specific surface ($\sigma$) of approximately 20–60 m$^2$/g. These particles P1, P2 are provided as two solid phases for a functional layer in which catalytic reactions can be carried out on a gas/solid interface by a combined action of the two solid phases and with gaseous reactants. The functional layer is manufactured from an ink prepared in accordance with the invention, the ink containing the dispersely distributed particles P1, P2. This ink can in particular be used for the manufacture of an electrode for high temperature fuel cells.

The fine-grain particles P1, P2 of the two solid phases formed in the first step 1 are dispersed in a first liquid L1, with the particles P1, P2 being mixed in this second step 2 such that a dispersion D with a homogeneous distribution of the particles P1, P2 is created. Advantageously, the second step 2 is carried out by means of a ball mill. The dispersion D is—third step 3—dried in a sprayed state. For this purpose, for example, the dispersion D is sprayed into a heated inert gas. An introduction of heat required for this spray drying can also take place by means of heat radiation and/or microwaves.

The fine-grain particles P1, P2 can also be obtained by milling from coarse-grain particles. In this case, the comminution of the particles and their dispersion can take place in combination in the ball mill of the second step 2. Steps 1 and 2 are thus combined in a common first step.

Figure 2:
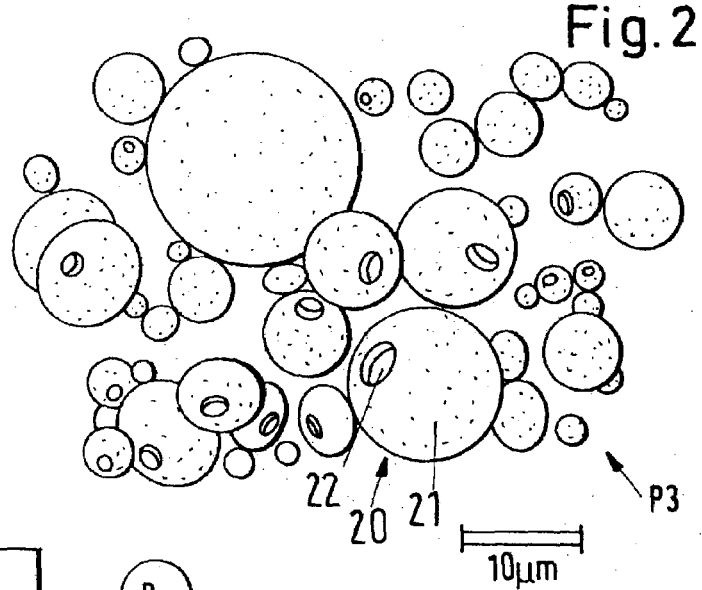
FIG. 2 shows an intermediate product of the method which has been obtained by spray drying.
Figure 3:
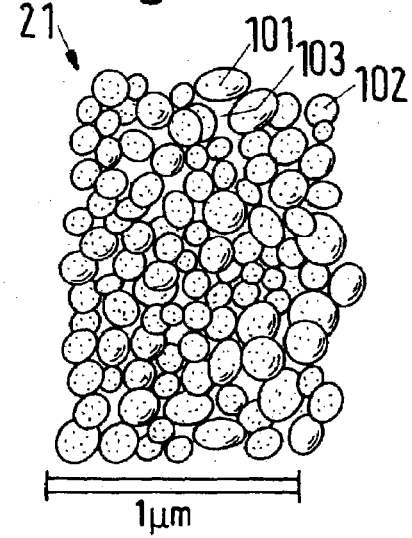
FIG. 3 shows a conglomerate with two solid phases.

In FIG. 2, the intermediate product P3 of the method, which is gained by spray drying, is shown. It consists, at least in part, of small hollow spheres 20 whose surfaces 21 each have an opening 22 leading into the interior space. An enlarged representation of the surface 21 is shown in FIG. 3 (magnification of approximately twenty times). A conglomerate of particles 101 (=P1) and 102 (=P2) can be seen which form the two solid phases. Micro-pores 103 are located between these particles.

Heterogeneous conglomerates P3 can also be produced by means of other process steps. For example, by mixing in a suitable flocculating agent for the dispersion D, the fine-grain particles P1 and P2 combine to form associations in which the two particle types are arranged in mixed form. With a subsequent removal of the first liquid L1, in particular by drying, the heterogeneous conglomerates result from the particle associations. A base can, for example, be used as the flocculation agent with which the pH is increased. Organic substances such as alcohols can also be used. The particle associations settle and can be separated in a decanter from a part of the first liquid L1. The sediment can be dried in a fluidized bed.

In the intermediate product P3, which consists of the heterogeneous conglomerates of the fine-grain particles P1 and P2, these particles P1, P2 are homogeneously distributed without forming homogeneous aggregations of the same solid phases. The dried conglomerates are burned in a fourth step 4 so that, in the example of spray drying, the particles P1, P2 in the small spheres 20 are connected to one another by sintering.

These conglomerates are mixed after sintering, in a fifth step 5, by addition of a second liquid L2 and during comminution to form a homogeneous ink P. Thanks to the comminution, a larger proportion of solid results and consequently a lower porosity of the functional layer which can ultimately be manufactured. The end product P contains the heterogeneous conglomerates as fractions or in uncomminuted form. The particles formed in the first step have such a fine grain that the fractions of the heterogeneous conglomerates each contain a plurality of particles P1, P2 of both solid phases after comminution. The specific surface ($\sigma$) of the particles of P amounts to approximately 3–10 m$^2$/g.

The spray-dried and sintered conglomerates can be comminuted or crushed in a ball mill. Substantially larger balls are used in the further processing in the second mill in comparison with the balls of a first mill used for the second method step 2. Fractions are thus created from the conglomerates which are substantially larger than the fine-grain particles P1, P2 from which a well-mixed dispersion has been prepared in the first mill.

Figure 4:
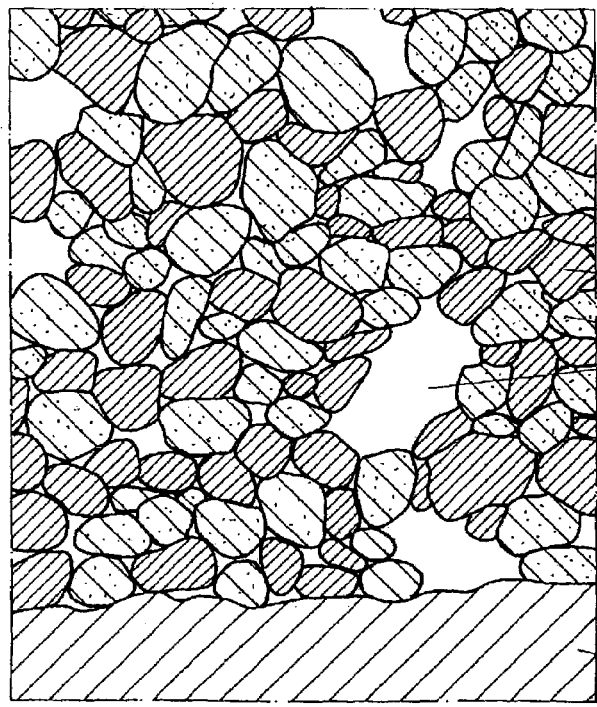
FIG. 4 is a section through a porous functional layer containing two solid phases.

By screen printing of the ink in accordance with the invention onto a substrate 60, see FIG. 4, and by subsequent drying and sintering, a functional layer 6 is obtained which is shown section-wise in FIG. 4 as a cross-section. This layer 6 consists of the fine-grain particles 101 and 102 which form the two solid phases and of macro-pores 104 and micro-pores 104' which form a communicating pore space. Most of the micro-pores 104' already existed in the conglomerates as micro-pores 103. The macro-pores 104 arise between the conglomerates or their fractions. The existence of the macro-pores 104 is favorable since they allow a rapid coarse distribution of the gaseous reactants.

The three-phase points required for catalytic reactions are located at the interface between the pore space and the fixed components, and indeed where the particles 101, 102 of the two solid phases are in contact.

The substrate 60 is, for example, a mechanically resistant film whose resistant component is a layer of solid electrolyte. The resistant component of the film can also be a porous carrier structure of anode material.

For the manufacture of the anode of a high temperature fuel cell, an "active oxide" is provided as the first solid phase which has the following chemical composition: $Ni_{1-x}M_xO$, where x=0–0.05 and M=Cu, V, Mg, Pt, Co, Fe, Mo, W; for the second solid phase, which has the function of a conductor of oxygen ions and electrons, substance classes with the following chemical compositions are provided:

a) $Y_xM'_yZr_{1-x-y}O_2$, where x=0–0.1 and y=0–0.1 and M'=Ti, Mn, Al, Nb or b) $Ce_{1-x-y}M''_xM'''_yO_2$, where x=0–0.4 and y=0–0.05 and M''=Gd, Sm, Y and M'''=Co, Fe, Mn.

The two solid phases are joined together in proportions whose ratio (active oxide with respect to second solid phase) lies—in weight percent—in a range from 50:50 to 70:30.

For the manufacture of the cathode of a high temperature fuel cell, a substance class is provided as the first solid phase which is defined by the following chemical composition: $La_{1-x-y}M^*_xMn_{1-z}M^{**}_zO_3$, where x=0.1–0.3; y=0–0.05 and z=0–0.5 and M*=Sr, Ca and M**=Co, Fe; for the second solid phase, the same substance classes and the same proportion are provided as in the example for the anode.

Water is advantageously used as the first liquid L1 with which at least one additive, in particular a tenside, is mixed. As the second liquid L2, a substance mixture usual for screen printing is used which contains solvents and additives, for example binding agents.

The invention claimed is:

1. A method of preparing an ink which can be used for the manufacture of a functional layer, which ink contains dispersely distributed particles forming first and second solid phases, with catalytic reactions being able to be activated in the manufactured functional layer on a gas/solid interface by a combined action of the first and second solid phases and with gaseous reactants, wherein, in a first step, the solid phases are formed as fine-grain particles; wherein the particles of the solid phases are dispersed in a first liquid in a mixed and homogeneously distributed manner; wherein heterogeneous conglomerates of the fine-grain particles are formed from the thereby created dispersion; wherein the conglomerates are mixed to form a homogeneous ink, after sintering, by addition of a second liquid and by comminution, with particles formed in the first step having such a fine grain that the heterogeneous conglomerates and their fractions each contain a plurality of particles of the first and second solid phases after comminution. wherein the first solid phase is an "active oxide" which has the following chemical composition:

$Ni1-xMxO$, where $x=0-0.05$ and M=Cu, V, Mg, Pt, Co, Fe, Mo, W;

and the second solid phase has the following chemical composition:

$YxM'yZr1-x-yO2$, where $x=0-0.1$ and $v=0-0.1$ and M'=Ti, Mn, Al, Nb or $Ce1-x-yM''xM'''yO2$, where $x=0-0.4$ and $y=0-0.05$ and M''=Gd, Sm, Y and M'''=Co, Fe, Mn; and wherein the first and second solid phases have a ratio—in weight percent—in a range from 50:50 to 70:30.

2. A method in accordance with claim 1, wherein the dispersion is dried in a sprayed state such that the heterogeneous conglomerates are created with spray drying; or wherein the heterogeneous conglomerates are formed by mixing a flocculating agent into the dispersion and subsequent drying of the dispersion treated in this manner.

3. A method in accordance with claim 1, wherein the first liquid comprises water and at least one additive; and wherein the second liquid is a mixture of substances usual for screen printing colors which includes solvents and additives.

4. A method according to claim 3 wherein the at least one additive comprises a tenside.

5. A method according to claim 3 wherein the additive in the mixture comprises a binding agent.

6. A method in accordance with claim 1, wherein the particles formed in the first step are manufactured with a chemical method and are dispersed in a first ball mill; and wherein the heterogeneous conglomerates are further processed in a second ball mill, with the balls of the second mill being substantially larger than those of the first mill.

7. A method according to claim 1 wherein the functional layer comprises an electrode for fuel cells.

8. A method of preparing an ink which can be used for the manufacture of a functional layer, which ink contains dispersely distributed particles forming first and second solid phases, with catalytic reactions being able to be activated in the manufactured functional layer on a gas/solid interface by a combined action of the first and second solid phases and with gaseous reactants, wherein, in a first step, the solid phases are formed as fine-grain particles; wherein the particles of the solid phases are dispersed in a first liquid in a mixed and homogeneously distributed manner; wherein heterogeneous conglomerates of the fine-grain particles are formed from the thereby created dispersion; wherein the conglomerates are mixed to form a homogeneous ink, after sintering, by addition of a second liquid and by comminution, with particles formed in the first step having such a fine grain that the heterogeneous conglomerates and their fractions each contain a plurality of particles of the first and second solid phases after comminution, wherein the first solid phase has a chemical composition in accordance with $La1-x-yM*xMn1-zM**zO3$, where $x=0.1-0.3$; $y=0-0.05$ and $z=0-0.5$ and M*=Sr, Ca and M**=Co, Fe; and wherein the first and second solid phases have a ratio—in weight percent—in a range from 50:50 to 70:30.

9. A method in accordance with claim 8, wherein the dispersion is dried in a sprayed state such that the heterogeneous conglomerates are created with the spray drying; or wherein the heterogeneous conglomerates are formed by mixing a flocculating agent into the dispersion and subsequent drying of the dispersion treated in this manner.

10. A method in accordance with claim 8, wherein the first liquid comprises water and at least one additive; and wherein the second liquid is a mixture of substances usual for screen printing colors which includes solvents and additives.

11. A method in accordance with claim 8, wherein the particles formed in the first step are manufactured with a chemical method and are dispersed in a first ball mill; and wherein the heterogeneous conglomerates are further processed in a second ball mill, with the balls of the second mill being substantially larger than those of the first mill.

* * * * *